July 8, 1952     L. F. SAMLER     2,602,187
TAPE EXTRUSION

Original Filed March 11, 1946     2 SHEETS—SHEET 1

INVENTOR.
Lee P. Samler,
BY
Flocks and Simon
ATTORNEY

July 8, 1952  L. F. SAMLER  2,602,187
TAPE EXTRUSION

Original Filed March 11, 1946  2 SHEETS—SHEET 2

INVENTOR.
Lee R. Samler,
BY Flocks and Simon
ATTORNEYS.

Patented July 8, 1952

2,602,187

UNITED STATES PATENT OFFICE 2,602,187

TAPE EXTRUSION

Lee F. Samler, Baltimore, Md., assignor to The National Plastic Products Company, Odenton, Md., a corporation of Maryland Original application March 11, 1946, Serial No. 653,551. Divided and this application December 19, 1949, Serial No. 133,894

14 Claims. (Cl. 18—12)

This invention relates to apparatus for the production of extruded thermoplastic tape and more particularly to the production of such tape by the utilization of extrusion equipment which will serve to insure uniform cross-sectional thickness and which will maintain the physical and electrical properties of the thermoplastic.

This application is a division of co-pending application Serial No. 653,551, filed March 11, 1946, which issued on March 7, 1950, as Patent No. 2,499,421.

Prior to the instant invention, thermoplastic tapes have been extruded in the conventional manner through a die and onto a moving belt. In practice, when the thickness of the tape is in excess of .025" it has been found that it is difficult to control the flow conditions in the die and if the exit velocities across the die are not accurately controlled inherent stresses will be set up within the material which will ultimately be reflected by distortion and/or shrinkage in the finished product.

It is an object of the instant invention to provide apparatus for the production of continuous lengths of substantially stress-free thermoplastic tape of substantially uniform cross-sectional thickness.

It is another object to provide a novel die assembly for a thermoplastic extruder.

Other objects and the nature and advantages of the instant invention will be apparent from the following description taken in conjunction with the accompanying drawings, wherein.

Figure 1:
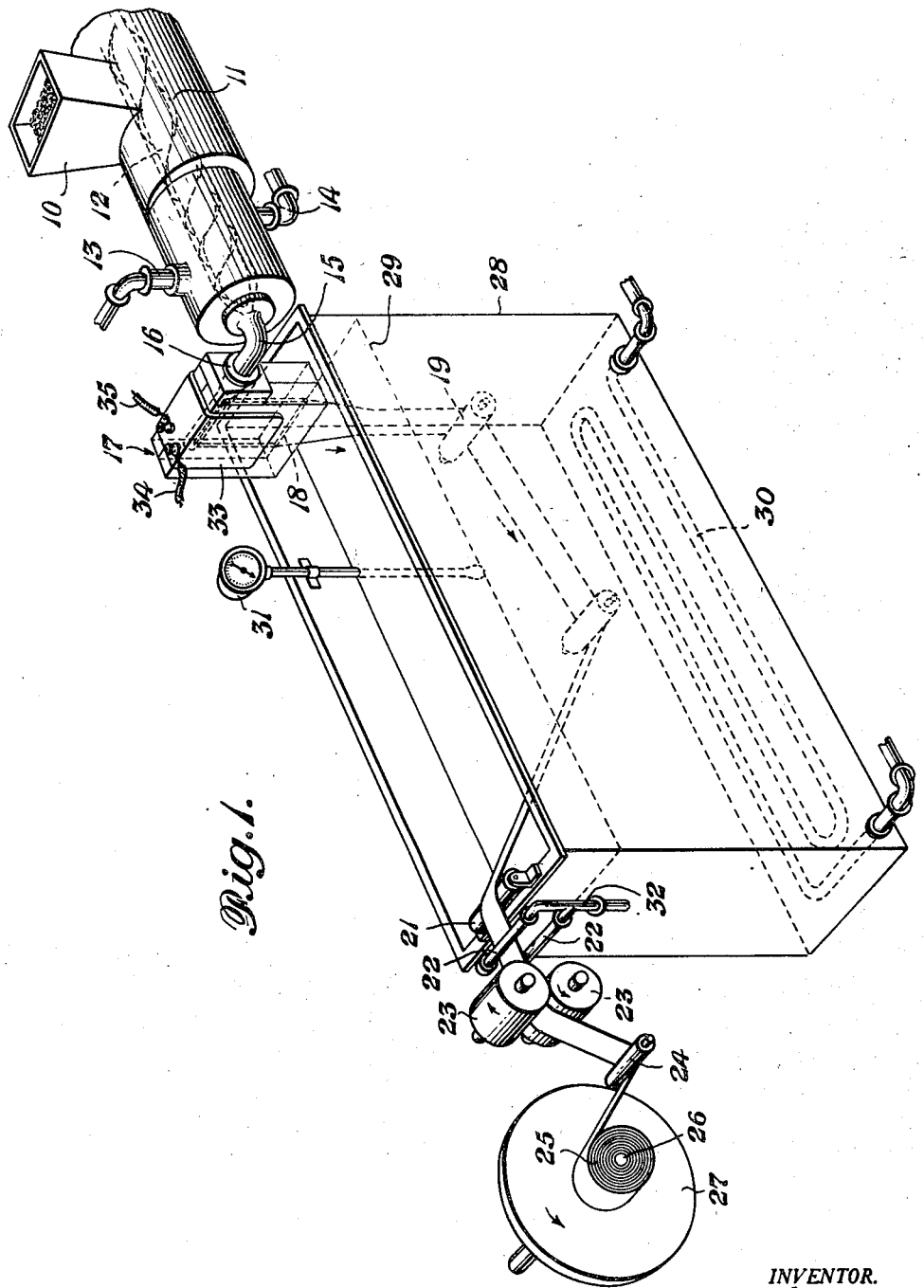
Fig. 1 is a schematic view in perspective of an apparatus for carrying out the invention.
Figure 2:
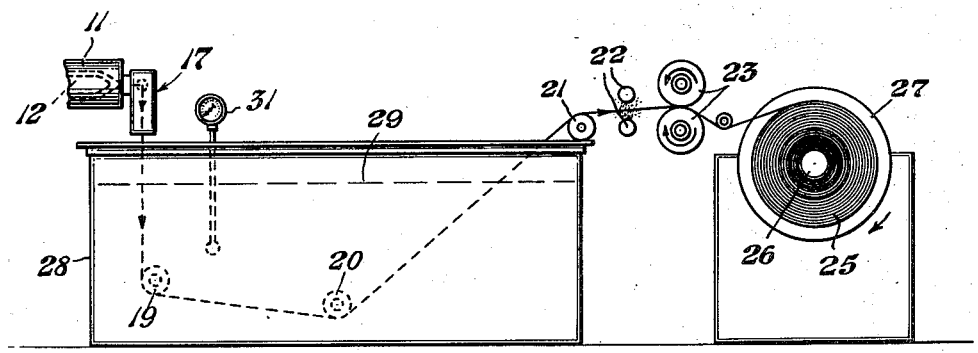
Fig. 2 is a schematic view in side elevation of the apparatus shown in Figure 1.

Referring to Figures 1 and 2, the thermoplastic compound in either powder, pellet, or other convenient form is introduced into the top of the feed hopper 10 which is associated with the extrusion cylinder 11 within which is located the extrusion screw 12. The extrusion cylinder 11 may be heated in the conventional manner and in the drawings the extrusion cylinder 11 is jacketed so that the cylinder may be heated by steam, and the pipes 13 and 14 are part of the steam heating system for heating the cylinder 11. The extrusion screw 12 forces the melted plastic compound through the conduit 15 which confines the melted plastic to a path which changes the direction of flow from that which is coaxial with the axis of the screw to a direction which is at right angles to the axis of the screw and in the same horizontal plane. The conduit 15 is connected at its outlet end 16 with the die assembly 17.

The plastic compound in the form of tape leaves the bottom 18 of the die assembly 17 and in a direction which is aligned with the land of the die and passes under the roller 19 and moves on toward a position under the roller 20 and then upwardly and forwardly to a position where it passes over the guide roll 21 and then horizontally and between the washing headers 22 from whence the tape passes between the take-off or pulling rolls 23 which turn in opposite directions in the direction of the arrows. The tape then passes under the guide roll 24 and is then wound up in the form of a coil 25 on the spindle 26 of the reel 27.

The rollers 19 and 20 are journalled for rotation within the tank 28 which may contain a tempering liquid, such as water 29, which tempering liquid may be heated by the steam coils 30 located within the tank 28. The thermometer 31 registers the temperature of the tempering liquid 29 and may be associated with a control for regulating the temperature of the tempering liquid by controlling the flow of steam through the steam coils 30. The location of the roll 20 may be lower than the location of the roll 19 so that the portion of the tape between the exit of the die and the roll 19 will make an angle of more than 90° with a portion of the tape between the roll 19 and the roll 20.

The headers 22 are provided with a series of orifices along the surfaces adjacent the top and bottom of the extruded tape, which passes between the headers 22 so that as washing fluid, which is fed to the manifold 32, passes through the headers 22 it will be directed through said orifices and on to the top and bottom surfaces of the extruded tape which passes between the headers 22 to wash same and remove any foreign particles which may be picked up in the tempering bath or from the atmosphere. Except when plastic compound is being fed to the hopper 10, the hopper may be covered so as to prevent the entrance of any foreign material into the extrusion cylinder 11.

The die 17 may be heated by the electric heater 33 which is served with electric current by the electric conduits 34 and 35.

Figure 3:
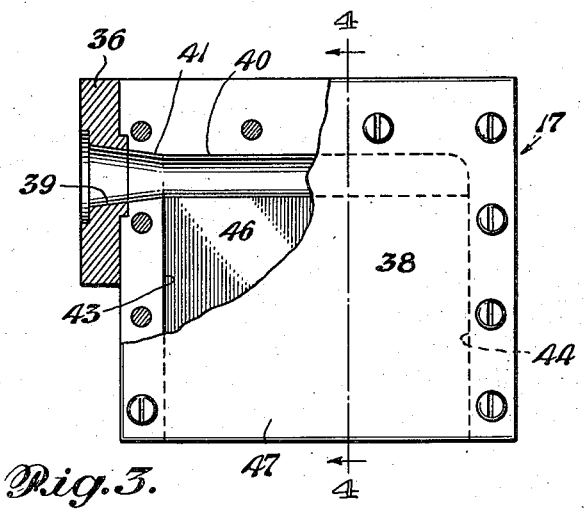
Fig. 3 is a front elevation with parts broken away and parts shown in section of an extruder die useful in carrying out the invention.
Figure 4:
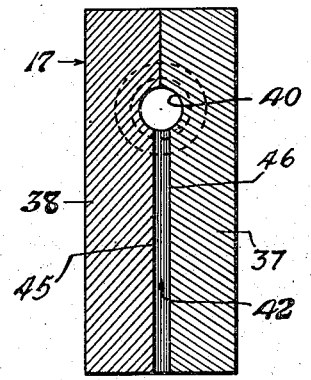
Fig. 4 is a vertical sectional view taken along line 4—4 of Fig. 3 and looking in the direction of the arrows.
Figure 5:
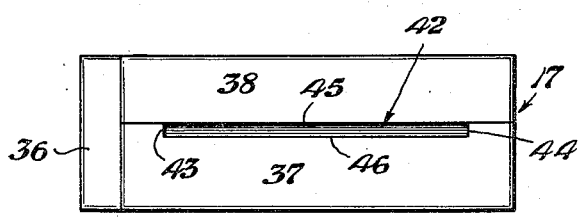
Fig. 5 is a bottom view of the die shown in Figure 3.

Referring to Figures 3, 4 and 5, the die 17 may be made of steel and of three parts comprising an inlet adaptor 36, and two major block-like elements 37 and 38, respectively. The adaptor 36 is formed with a tapered opening 39 extending therethrough which is adapted to be associated with the outlet end 16 of the conduit 15. A tubular manifold 40 of relatively large diameter is formed within the die by block-like elements 37 and 38, and the inlet portion 41 thereof is adapted to be associated with the passage 39 extending through the adaptor 36. The manifold 40 is adapted to extend horizontally and when in position has its axis at right angles to the axis of the screw 12. As best shown in Fig. 5, the narrow sides 43 and 44 and the face 46 of die land 42 are formed in block 37, wherein the inner surface of block 38 forms the face 45 of die land 42. The manifold 40 is formed in both blocks 37 and 38 as shown in Fig. 4.

One of the significant elements cooperating in the production of a stress-free thermoplastic tape of uniform cross section is the length of the effective die land which, in the case of the die 17, is the vertical distance from the tubular manifold 40 to the bottom 47. This effective length of the die land should be at least twenty-five times the thickness of the tape to be produced, and in the production of polyethylene tape fifty times the thickness of the tape has been found to be preferred. In the production of thermoplastic tapes, shorter die lands serve to produce a non-uniform exit velocity across the width of the die; that is from the narrow side 43 to the narrow side 44 at the bottom 47 and a tape produced through the use of such a die has inherent stresses therein. If the axis of the die were in line with the axis of the extruder screw, the tendency of the plastic material leaving the die is to have a greater velocity in the center; that is, midway between the narrow sides 43 and 44, and a lesser velocity adjacent the narrow sides 43 and 44. However, in the case of thick cross sections, such as tapes of a thickness of .025" or greater, even with the axis of the die at right angles to the axis of the screw, and even with the die arranged as shown in the drawings, unless the length of the effective land of the die is as described, the exit velocity of the material being extruded will be greater along the side 43 than along the side 44 so that the section of material passing through the die would be generally wedge-shaped instead of rectangular in shape. The long land described insures the proper cross-sectional shape of the tape.

In the production of polyethylene tape, the exposure of the material to high temperatures over a period of time requires critical control if electrical properties thereof are not to be degraded. Though flow conditions of the material through the apparatus may be improved by increasing the temperature of the material at the die and in the cylinder, the electrical properties naturally inherent in the material will be degraded as it is subjected to high temperatures over a period of time. The extrusion process inherently requires a given period of time in its operation and, accordingly, in the production of polyethylene tape of the character which is to have its natural electrical properties undegraded by thermal abuse, the highest temperatures in the system are to be maintained as low as possible. It has been found in operation of the process described that temperatures in the cylinder of approximately 360° F. and die temperatures of 350° F. may be maintained for polyethylene tape thicknesses within the range of .070" to .085". The contour of the passage leading from the cylinder to the exit of the die should be so designed as to prevent stagnation of the material as such stagnation would cause possible degradation by exposure to heat-time factor of degrading character. Accordingly, the passage leading from the cylinder to the manifold 40 is of large cross section of smooth profile and the manifold 40 is of large cross section and smooth profile as compared with the distance between the face 45 and face 46 of the die land 42.

In the extrusion process, the take-up rolls 23 travel at such a rate as to correspond to a higher lineal velocity of the tape at this point in the process than the lineal velocity of the tape leaving the exit of the die 17. This difference in velocity serves to effect a pull-down or diminishing of the thickness of the tape so that the finished thickness of tape will be less than the distance between the faces 45 and 46 of the die 17 at the bottom 47. This pull-down occurs between the bottom of the die and the point where the tape enters the tempering bath wherein the tape is cooled so that the amount of pull-down or hot stretch can be controlled by varying the fluid level within the tempering bath or varying the speed of the take-up rolls 23. In the process described, the rollers 19 and 20 have their surfaces traveling at the same speed as the surfaces of the rollers 23. The roll 19 is so located within the tank 28 and below the die 17 that the axial travel of the tape, while it is being pulled down and at least partially tempered or cooled, is aligned with the axis of the die land 42. In the process, the amount of pull-down should be near the minimum required for proper control of movement of the tape through the travel recited and a pull-down within the range of 25% to 30% under the conditions herein referred to has been found to be satisfactory.

It will be obvious to those skilled in the art that various changes may be made without departing from the spirit of the invention and therefore the invention is not limited to what is shown in the drawings and described in the specification but only as indicated in the appended claims.

What is claimed is:

1. In extrusion apparatus for the production of extruded stress- and strain-free thermoplastic tape of uniform cross-sectional thickness comprising an extrusion cylinder and means for forcing thermoplastic to be extruded therethrough, a die having an inlet and an outlet, a conduit forming a passageway connecting the outlet of said cylinder with the inlet of said die, said die comprising a generally tubular manifold having an inlet at one end thereof and a die land, said die land having a length at least twenty-five times the thickness of the tape to be produced the exit velocity of the thermoplastic material along the entire length of the die land being equalized, the axis of the die land being substantially at right angles to the axis of the manifold, said manifold extending completely across the ingress side of said die land.

2. The structure recited in claim 1, said die land having a length of fifty times the thickness of the tape to be produced.

3. The structure recited in claim 1, said conduit being in the shape of an elbow.

4. The structure recited in claim 1, said die comprising a plurality of cooperating block-like elements having formed therein said manifold and said die land.

5. The structure recited in claim 4, said manifold having its inlet connected to the outlet of said conduit by a hollow truncated cone-shaped adaptor.

6. The structure recited in claim 1, said die land having a substantially constant cross section area the entire length thereof corresponding to the cross sectional shape of the tape to be extruded.

7. The structure recited in claim 1, said manifold having a smaller cross section than said conduit.

8. The structure recited in claim 1, said manifold being of circular cross section, the cross sectional configuration of said die land being rectangular.

9. The structure recited in claim 8, said die land having a substantially constant cross sectional area the entire length thereof.

10. In extrusion apparatus for the production of extruded stress and strain free thermoplastic type of uniform cross-sectional thickness, a die comprising a generally tubular manifold having an inlet at one end thereof, and a die land, said die land having a length at least 25 times the thickness of the tape to be produced, the axis of the die land being substantially at a right angle to the axis of the manifold, said manifold extending completely across the ingress side of said die land, said manifold having a relatively large diameter as compared with the thickness of the die land whereby the exit velocity of the material being extruded is equalized along the entire length of the die land.

11. The structure recited in claim 10, said die comprising a plurality of cooperating block-like elements having formed therein said manifold and said die land.

12. In extrusion apparatus for the production of thermoplastic tape of uniform cross-sectional thickness, a die comprising a manifold and a die land, the axis of the die land being substantially at right angles to the axis of the manifold, said manifold extending completely across the ingress side of said die land, said die comprising a plurality of cooperating block-like elements having formed therein said manifold and said die land.

13. The structure recited in claim 12, said die comprising two cooperating block-like elements wherein three faces of said die land are formed in one of said block elements and the surface of the other of said block elements forms the fourth face of said die land.

14. The structure recited in claim 12, said manifold having a relatively large diameter as compared with the thickness of said die land whereby the exit velocity of the material being extruded is equalized along the entire length of the die land.

LEE F. SAMLER.

REFERENCES CITED

The following references are of record in the file of this patent:

UNITED STATES PATENTS

| Number | Name | Date |
| --- | --- | --- |
| 1,990,078 | Kinsella et al. | Feb. 5, 1935 |
| 2,175,961 | Kampfer | Oct. 10, 1939 |
| 2,229,422 | Schade et al. | Jan. 21, 1941 |
| 2,297,645 | Bailey | Sept. 29, 1942 |
| 2,318,469 | Derby et al. | May 4, 1943 |
| 2,479,804 | Bailey et al. | Aug. 23, 1949 |